(12) United States Patent
Hilt et al.

(10) Patent No.: US 9,386,093 B2
(45) Date of Patent: Jul. 5, 2016

(54) PRICE-AWARE NEIGHBORHOOD SELECTION FOR PEER-TO-PEER NETWORKS

(75) Inventors: Volker Hilt, Middletown, NJ (US); Ivica Rimac, Tinton Falls, NJ (US); Srinivasan Seetharaman, Mountain View, CA (US)

(73) Assignee: DEUTSCHE TELEKOM AG, Bonn (DE)

(*) Notice: Subject to any disclaimer, the term of this patent is extended or adjusted under 35 U.S.C. 154(b) by 1652 days.

(21) Appl. No.: 12/707,027

(22) Filed: Feb. 17, 2010

(65) Prior Publication Data

US 2011/0202651 A1    Aug. 18, 2011

(51) Int. Cl.
*G06F 15/16* (2006.01)
*H04L 29/08* (2006.01)

(52) U.S. Cl.
CPC ........ *H04L 67/1072* (2013.01); *H04L 67/1063* (2013.01)

(58) Field of Classification Search
CPC ................. H04L 67/1072; H04L 67/1063
USPC .................. 709/201, 205, 224, 238
See application file for complete search history.

(56) References Cited

U.S. PATENT DOCUMENTS

| 7,379,967 | B2  | 5/2008  | Izutsu et al. |
| 7,920,572 | B2* | 4/2011  | Bates et al. ............ 370/395.2 |
| 2007/0064702 | A1 | 3/2007 | Bates et al. |
| 2007/0214259 | A1* | 9/2007 | Ahmed et al. ............ 709/224 |
| 2009/0182815 | A1* | 7/2009 | Czechowski et al. ........ 709/206 |
| 2010/0293294 | A1* | 11/2010 | Hilt et al. ................. 709/241 |
| 2011/0078312 | A1* | 3/2011 | Rimac et al. ............. 709/227 |

OTHER PUBLICATIONS

Bindal et al., Improving Traffic Locality in BitTorrent via Biased Neighbor Selection. In Proceedings of IEEE ICDCS, 2006, obtained from internet at http//theory.stanford.edu/~cao/biased-bt.pdf on Jul. 15, 2010.

Cohen, Incentives Build Robustness in BitTorrent. In Proceedings of the 1st Workshop on Economics of Peer-to-Peer Systems, Jun. 2003, obtained from internet at http://citeseerx.ist.psu.edu/viewdoc/summary?doi=10.1.1.14.1911 on Jul. 15, 2010.

(Continued)

*Primary Examiner* — Emmanuel L Moise
*Assistant Examiner* — Marie Georges Henry
(74) *Attorney, Agent, or Firm* — Leydig, Voit & Mayer, Ltd

(57) ABSTRACT

A method and apparatus for peer-to-peer file sharing is provided. In some embodiments, the method includes receiving a request for a list of neighbor peers, where the request is made by a requesting peer device, and where the requesting peer device has a local internet service provider (ISP). The method may also include employing a server device to rank each neighbor peer in a plurality of neighbor peers based on whether the respective neighbor peer is external to the local ISP, and if the respective neighbor peer is external to the ISP, further based on a cost metric associated with a next ISP hop from the requesting peer device to the respective neighbor peer. The method may also include generating the list of neighbor peers based on the ranking of the neighbor peers, and enabling transmission of the list of neighbor peers to the requesting peer device.

10 Claims, 8 Drawing Sheets

(56) References Cited

OTHER PUBLICATIONS

Guo et al., Measurements, analysis, and modeling of bittorrent-like systems. In Proceedings of ACM IMC, pp. 35-48, 2005, obtained from internet at http://conferences.sigcomm.org/imc/2005/papers/imc05efiles/guo/guo.pdf on Jul. 16, 2010.

Izal et al., Dissecting BitTorrent: Five months in a torrent's lifetime. In Proceedings of PAM Workshop, 2004, obtained from internet at http://www-sop.inria.fr/planete/alhamra/PAM04.pdf on Jul. 15, 2010.

Karagiannis et al., Should Internet Service Providers Fear Peer-Assisted Content Distribution? In Proceedings of ACM Internet Measurement Conference (IMC), Oct. 2005, obtained from internet at http://www.usenix.org/event/imc05/tech/full_papers/karagiannis/karagiannis.pdf on Jul. 15, 2010.

Koomey, Estimating Total Power Consumption by Servers in the U.S. and the World, Staff Scientist, Lawrence Berkeley National Laboratory, Feb. 15, 2007, obtained from internet at citeseerx.ist.psu.edu/viewdoc/download?doi=10.1.1.87.5562&rep . . . on Jul. 12, 2010.

Martin et al., Assessing the Impact of BitTorrent on DOCSIS Networks. In Proceedings of IEEE Broadnets, Sep. 2007, obtained from internet at http://citeseerx.ist.psu.edu/viewdoc/summary?doi=10.1.1.130,5244 on Jul. 15, 2010.

Pouwelse et al., The Bittorrent P2P File-sharing System: Measurements and Analysis. In Proceedings of the 4th IPTPS, Feb. 2005, obtained from internet at http://www.pds.ewi.tudelft.nl/~epema/Papers/IPTPS2005.pdf on Jul. 15, 2010.

Seetharaman et al., Characterizing and Mitigating Inter-domain Policy Violations in Overlay Routes. In Proceedings of IEEE ICNP, Nov. 2006, obtained from internet at http:/www.stanford.edu/~seethara/papers/icnp06.pdf on Jul. 15, 2010.

* cited by examiner

PRICE-AWARE NEIGHBORHOOD SELECTION FOR PEER-TO-PEER NETWORKS

TECHNICAL FIELD

The present invention relates generally to peer-to-peer networks, and in particular but not exclusively, to an apparatus, method, system, and manufacture for altering a neighbor list generation in a neighbor-based peer-to-peer network so that the neighbor list is based, in part, on a cost metric associated with a next Internet Service Provider (ISP) hop.

BACKGROUND

Peer-to-peer (P2P) file-sharing networks may be used to distribute large amounts of data between users on a network. By way of example, BitTorrent is a commonly-used protocol for transferring large files on the Internet, and is estimated to account for about 25% to 35% of all Internet traffic.

In a typical P2P (peer-to-peer) file-sharing scenario, a content file (e.g., movie or application) is seeded (disseminated) to one or more P2P clients running on host(s) connected to a network. In some P2P protocols, a tracking file (e.g., a "torrent" file in a BitTorrent network) is distributed that identifies the content file and tracking hosts (also known as "trackers") that can provide information on how to contact clients sharing the content file (e.g., the seeded P2P clients, as well as other clients that may have copies of fragments of the content file). Peers obtain various fragments of the content file and share these fragments with other peers until all peers interested in the content obtain copies of all fragments, and hence have a complete copy of the content. Sharing often continues even after the original seeded content file has been removed.

In the BitTorrent protocol, trackers keep track of clients (peers) who are interested in obtaining and hosting fragments of the content file. Each peer communicates with other peers to announce which fragments they can provide and determine which fragments they can receive. Peers then exchange fragments in a "tit-for-tat" (TFT) sharing scheme that attempts to maintain parity between the amount of data received and the amount of data given. Peers involved in content-fragment exchanges for a particular content file are sometimes referred to as a "swarm" related to that content file.

Peers have different relations depending upon whether they are seeking a content fragment, or whether they possess a content fragment. Each peer in the system is either a leecher that is trying to obtain the complete content, or a seed that has complete content. However, all peers are serving content to other leechers using certain performance-aware policies. Typically, each peer makes a persistent TCP connection to each of its neighbors, who in turn add the peer onto their neighbor set, and learns about the pieces they have. Each neighbor also sends updates on the list of pieces they have, when they have a new piece.

In the BitTorrent protocol, a peer A, typically, uploads to only five interested leechers that are seeking content possessed by peer A. Of these five leechers, four (default) are selected based on their attractive transfer rate (upload rate if peer A is a seed, or download rate if peer A is a leecher). By default, all neighbors are choked, which prevents the neighbors from requesting pieces. When a peer is ready to upload content, it sends an unchoke message. The TFT mechanism in the BitTorrent protocol determines if a particular peer is to be unchoked. For a leecher A to unchoke another leecher B, the peer B needs to have uploaded content to peer A at an attractive rate. For a seed C to unchoke leecher B, the peer B needs to have downloaded content from peer C at an attractive rate.

Besides the four leechers unchoked based on performance, one other leecher is picked randomly from the set of interested neighbors every 30 seconds. This random selection, called optimistic unchoking, enables the peer to explore the neighborhood, thereby improving the chance of picking the best performing peers. Once unchoked, a leecher attempts to obtain the piece that is rarest in its neighborhood. This "rarest piece first" policy results in diversity elaboration among the neighbors, e.g., the "rarest piece" becomes possessed by an increasing number of peers.

The tracker randomly assigns neighbors from the set of previously seen peers. By default, a maximum of 50 neighbors are defined, but the protocol allows the client to request more neighbors from the tracker. Further, it is possible that a peer receives connection requests from other peers that are not yet its neighbors. Thus, the neighborhood of a peer is typically a random subset of the overall peers in the swarm.

In peer-to-peer networks where the neighbors from which clients download content are pre-determined, randomly decided neighbors may cause an Internet Service Provider (ISP) to incur increased expenses because of increased cross-ISP traffic. This increased cross-ISP traffic can result in significantly increased power consumption costs. The report "ESTIMATING TOTAL POWER CONSUMPTION BY SERVERS IN THE U.S. AND THE WORLD" by J. G. Koomey, Staff Scientist, Lawrence Berkeley National Laboratory, incorporated herein by reference in its entirety states "Total power used by servers represented about 0.6% of total U.S. electricity consumption in 2005. When cooling and auxiliary infrastructure are included, that number grows to 1.2%, an amount comparable to that for color televisions. The total power demand in 2005 (including associated infrastructure) is equivalent (in capacity terms) to about five 1000 MW power plants for the U.S. and 14 such plants for the world. The total electricity bill for operating those servers and associated infrastructure in 2005 was about $2.7 B and $7.2 B for the U.S. and the world, respectively." The power consumption as documented in this report is constantly increasing with the additional traffic generated by file-sharing.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
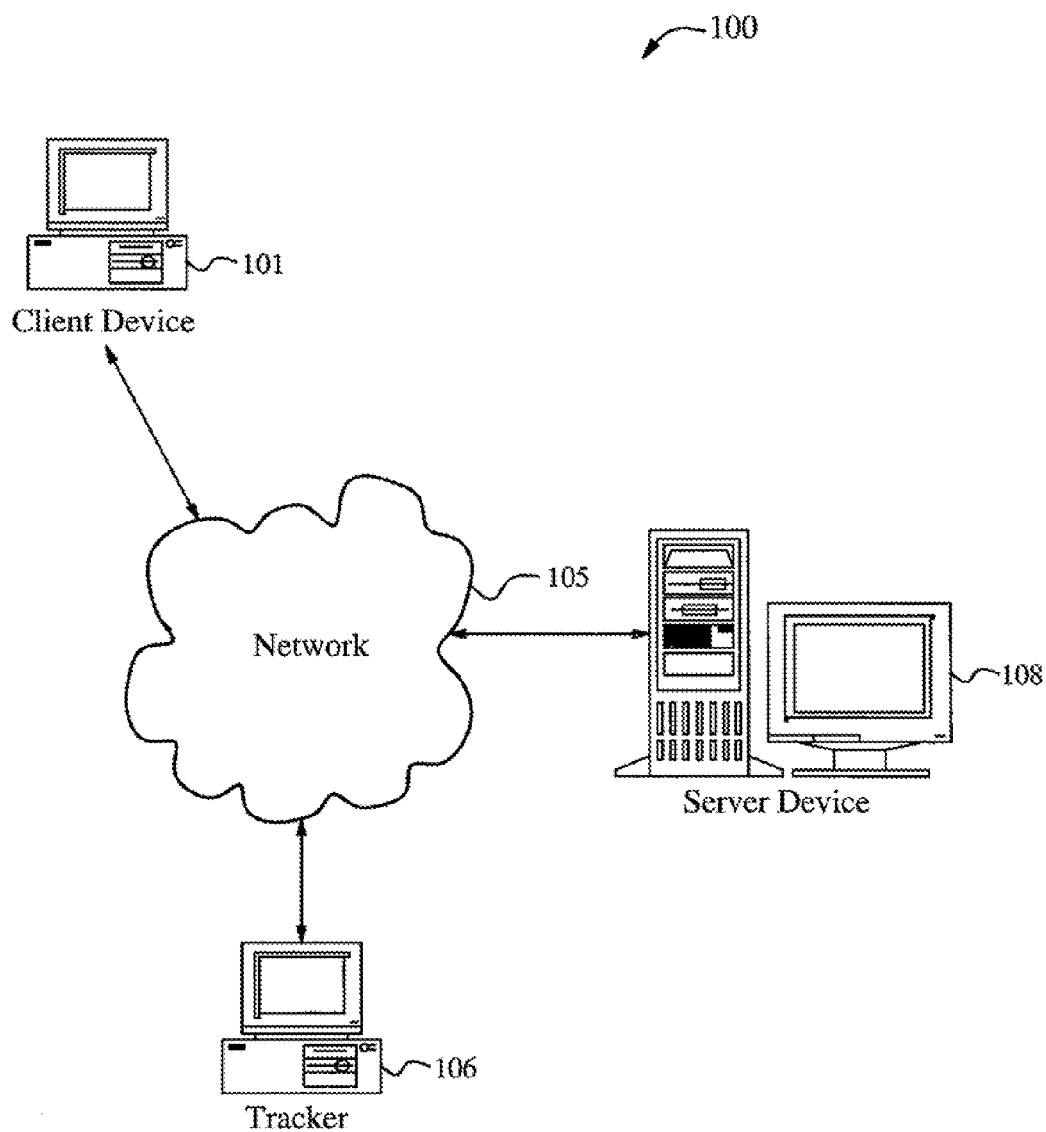
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a method and apparatus for peer-to-peer file sharing is provided. In some embodiments, the method includes receiving a request for a list of neighbor peers, where the request is made by a requesting peer device, and where the requesting peer device has a local Internet service provider (ISP). The method may also include employing a server device to rank each neighbor peer in a plurality of neighbor peers based on whether the respective neighbor peer is external to the local ISP, and if the respective neighbor peer is external to the ISP, further based on a cost metric associated with a next ISP hop from the requesting peer device to the respective neighbor peer. The method may also include generating the list of neighbor peers based on the ranking of the neighbor peers, and enabling transmission of the list of neighbor peers to the requesting peer device.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 105, client device 101, tracker 106, and server device 108.

One embodiment of a network device such as client devices 101, tracker 106, or server device 108 is described in more detail below in conjunction with FIG. 5.

Client device 101 may include virtually any computing device that typically connects using a wired or wireless communications medium such as personal computers, multiprocessor systems, microprocessor-based or programmable consumer electronics, network PCs, or the like. In one embodiment, client device 101 may be configured to operate over a wired and/or a wireless network.

Generally, client device 101 may also include virtually any mobile computing device capable of receiving and sending communications over a network, such as a wired network, wireless network, or the like. Such devices include portable devices such as, cellular telephones, smart phones, pagers, radio frequency (RF) devices, infrared (IR) devices, Personal Digital Assistants (PDAs), handheld computers, laptop computers, wearable computers, tablet computers, integrated devices combining one or more of the preceding devices, or the like.

Client device 101 typically ranges widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send communications.

Client device 101 also may include at least one other client application that is configured to receive content from another computing device. The client application may include a capability to provide and receive textual content, multimedia information, or the like. The client application may further provide information that identifies itself, including a type, capability, name, or the like. In one embodiment, client device 101 may uniquely identify itself through any of a variety of mechanisms, including a phone number, Mobile Identification Number (MIN), an electronic serial number (ESN), network address, or other device identifier. The information may also indicate a content format that the client device is enabled to employ. Such information may be provided in a communication, or the like, sent to another computing device.

Client device 101 may also be configured to communicate through email, Short Message Service (SMS), Multimedia Message Service (MMS), instant messaging (IM), internet relay chat (IRC), Mardam-Bey's IRC (mIRC), Jabber, or the like, with and between another computing device. However, the present invention is not limited to these communication protocols, and virtually any other communication protocol may be employed.

Although only one client device 101 is shown in FIG. 1, system 100 may contain many client devices. System 101 may contain many client devices that may each be a peer in a peer-to-peer network.

Network 105 connects server device 108, client device 101, and tracker 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or wired media such as twisted pair, coaxial cable, fiber optics, wave guides, and other wired media and wireless media such as acoustic, RF, infrared, and other wireless media.

Network 105 may include one or more wireless networks, which may include any of a variety of wireless sub-networks that may further overlay stand-alone ad-hoc networks, or the like, to provide an infrastructure-oriented connection for client devices. Such sub-networks may include mesh networks, Wireless LAN (WLAN) networks, cellular networks, or the like. A wireless network may further include an autonomous system of terminals, gateways, routers, or the like connected by wireless radio links, or the like. These connectors may be configured to move freely and randomly and organize themselves arbitrarily, such that the topology of the wireless network may change rapidly.

A wireless network may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, with various degrees of mobility. For example, the wireless network may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like.

Server device 108 is part of an Internet Service Provider (ISP) that offers customers, such as client device 101, access to network 105. In some embodiments, server device 108 may implement an Application-Layer Traffic Optimization (ALTO) service following the recommendations of the Internet Engineering Task Force (IETF). Client device 101 may include a peer-to-peer client which enables client device 101 to participate in peer-to-peer file sharing via a neighbor-based peer-to-peer protocol. Client device 101 initiates peer-to-peer file sharing by requesting a neighbor list. For example, if the neighbor-based peer-to-peer protocol being used is BitTorrent, the torrent files contains information about the tracking host or tracker 106, and client device 101 sends a request for a list of neighbor peers to tracker 106 to initiate peer-to-peer file sharing. However, the invention is not limited to the BitTorrent protocol, and other neighbor-based peer-to-peer protocols may be used rather than BitTorrent. In some embodiments, server 108 either controls tracker 106 or intercepts the request for neighbor peers so that server device 108 controls generation of the list of neighbor peers that is sent to client device 101 in response to the request, as explained in greater detail below. Another alternative is for the client device 101 to contact directly server device 108.

Figure 2:
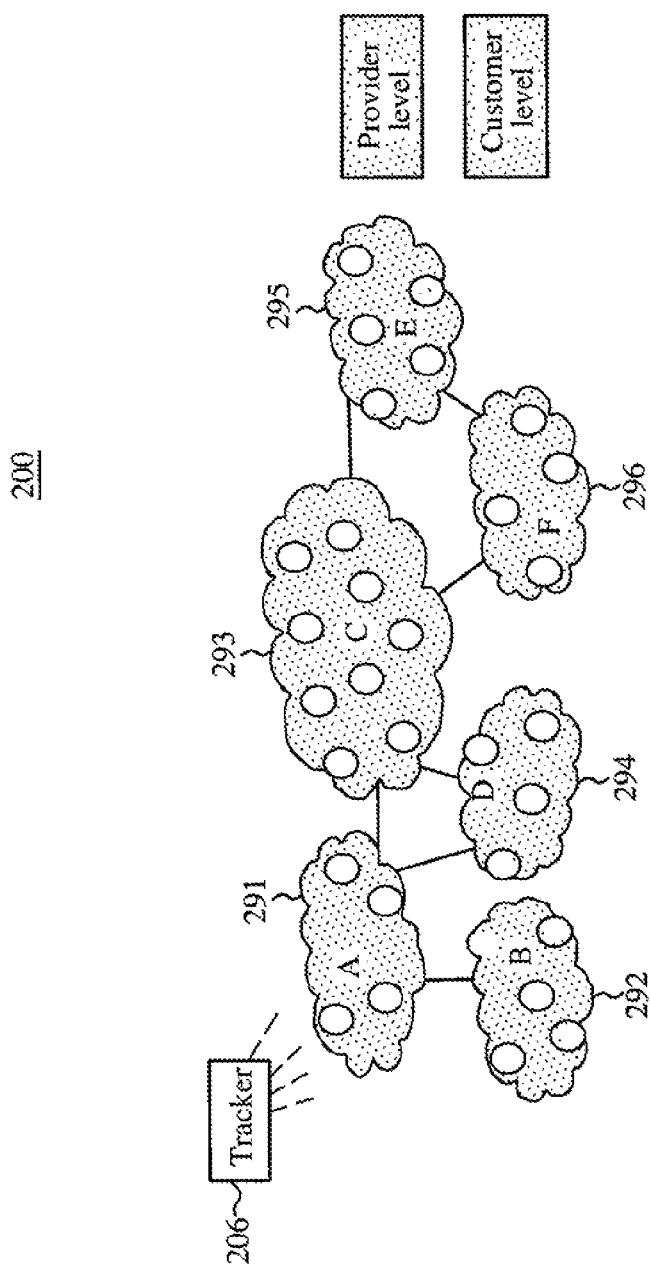
FIG. 2 illustrates a block diagram of an embodiment of the system in FIG. 1 with multiple domains shown.

FIG. 2 illustrates a block diagram of an embodiment 200, which may be an embodiment of system 100 in FIG. 1, with multiple domains (291-296) shown, where each domain is a separate ISP. For example, domain 291 may be the local ISP. As shown, some of the domains may be provider level domains and other domains may be customer level domains. In a peer-to-peer network, the peers for a particular tracking file can be spread across a vast number of ISPs, with the density depending on the type of ISPs, as explained in greater detail below.

Illustrative System with ISP Server Intercepting Request for Neighbor List

Figure 3:
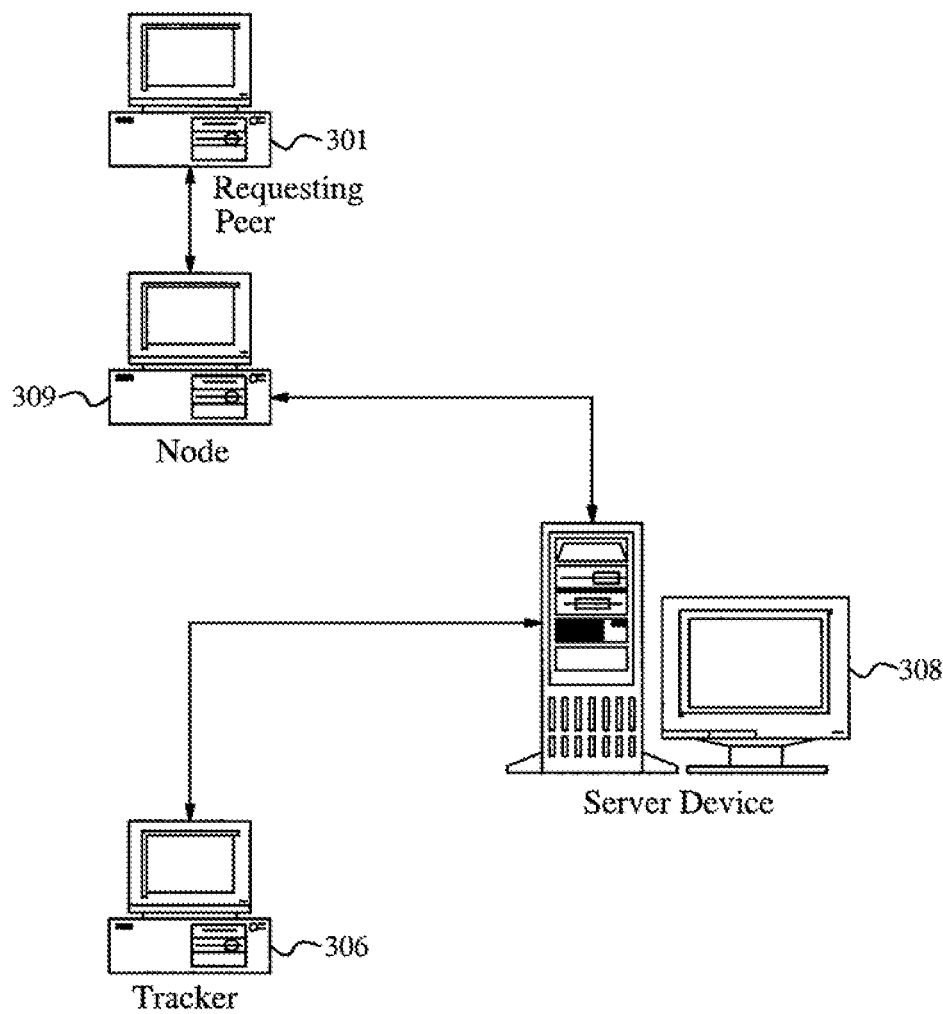
FIG. 3 illustrates a block diagram of one embodiment of the system of FIG. 1 in which the ISP intercepts a request for a list of network peers.

FIG. 3 illustrates a block diagram of one embodiment of the system of FIG. 1 in which the ISP server device intercepts a request for a list of network peers. In system 300, requesting peer 301 (which may be an embodiment of client device 101 of FIG. 1), makes a request for a list of neighbor peers to tracker 306. For example, a tracking file such as a torrent file may have identified tracker 306, and requesting peer 301 may request the list of neighbor peers to initiate the peer-to-peer file sharing. Requesting peer 301 obtains Internet access through a local ISP, which contains many networks nodes, including node 309. Node 309 is configured to identify network traffic associated with peer-to-peer networks, and to send a request for a list of neighbor peers from a requesting peer residing on the local ISP to server device 308 rather than sending the request to intended recipient tracker 306. Identifying such a request may be done, for example, by packet inspection. Packets associated with a particular peer-to-peer protocol and include a request for a list of neighbor peers can be identified by fields within a portion of the packet indicating that the packet is part of a request for a list of neighbor peers based on the protocol being employed. Packets determined to be a request for a neighbor list are re-routed from the tracker to the server device.

Server device 308 of the local ISP receives the request for a list of neighbor peers, and generates the list of neighbor peers rather than tracker 306. Server device 308 determines the neighbor peers available through communication with tracker 306. Server 308 provides the list of neighbor peers to requesting peer 301, via node 309 and/or other network nodes.

Illustrative System with ISP Server Controlling Tracker

Figure 4:
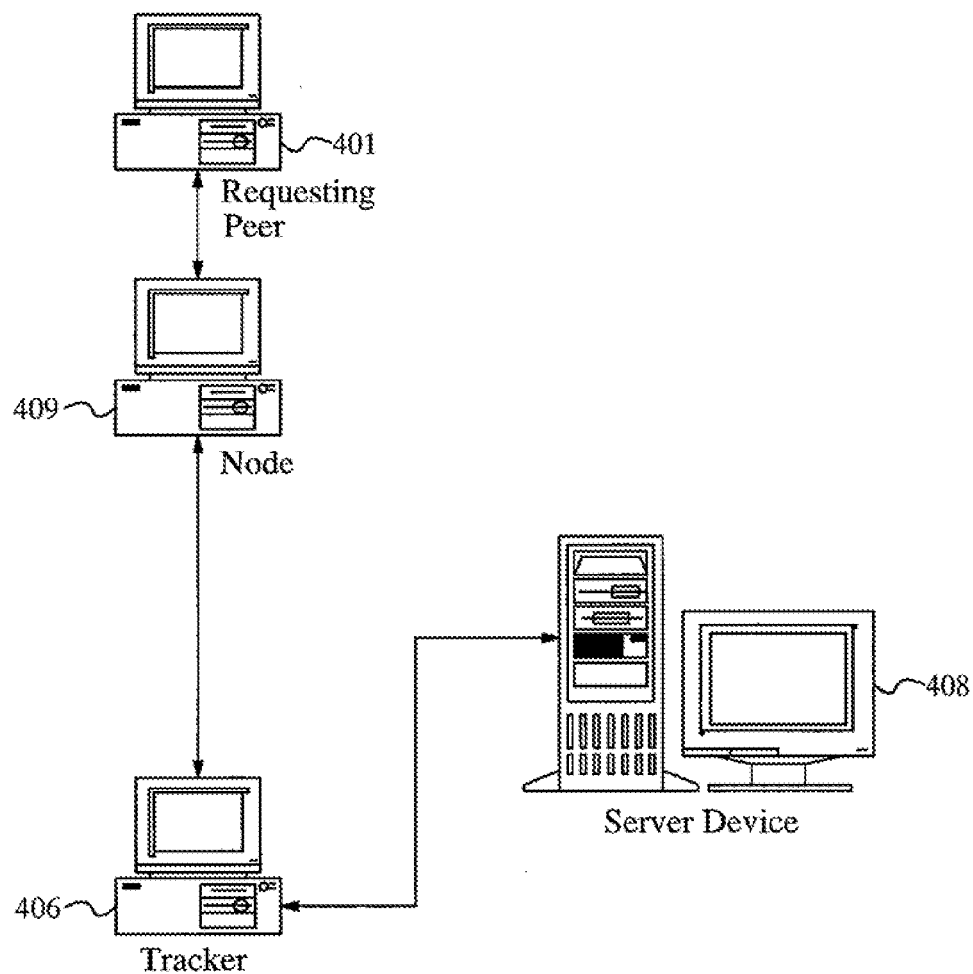
FIG. 4 shows a block diagram of one embodiment of the system of FIG. 1 in which the ISP controls the tracker.

FIG. 4 shows a block diagram of one embodiment of the system of FIG. 1 in which the ISP controls the tracker. In system 300 of FIG. 3, server device 308 controls generation of the list of neighbor peers by intercepting the request so that server device 308 processes the request rather than tracker 306.

In system 400 of FIG. 4, service device 408 instead controls generation of the list of neighbor peers by controlling tracker 406. In system 400, requesting peer 401 makes a request for a list of neighbor peers to tracker 406. For example, a tracking file such as a torrent file may have identified tracker 406, and requesting peer 401 may request the list of neighbor peers to initiate the peer-to-peer file sharing. Requesting peer 401 obtains internet access through a local ISP, which contains many networks nodes, including node 409. The request is sent from requesting peer 401 to tracker 409, via one or more network nodes such as node 409.

Server device 408 of the local ISP controls tracker 406. Tracker 406 generates the list of neighbor peers under the control of server device 408.

Alternatively, in other embodiments, tracker 406 itself may generate the list for neighbor files (in accordance with an embodiment of the ranking method described in greater detail below).

In other embodiments, tracker 406 and server device 408 implement an ALTO client and an ALTO server, respectively, following the recommendations of the IETF ALTO working group. In these embodiments, tracker 408 may then request guidance from service device 408 for the generation of the list for neighbors (in accordance with an embodiment of the ranking method described in greater detail below) through the ALTO request/response protocol as specified by the IETF ALTO working group.

Illustrative System with Client Contacting the ISP Server

According to one illustrative embodiment, the server device does not intercept the client device request nor does the server device control or guide the tracker in the generation of the list of neighbor peers. Instead, the client receives an unranked list from the tracker in response to its initial request. The client device than sends the unranked neighbor peer list in a request to the server device. The server device ranks the list in accordance with an embodiment of the ranking method described in greater detail below, and returns the ranked list in its response to the client.

In one embodiment of this illustrative system, the client device implements an ALTO client and the server device an ALTO server providing an interface to an ALTO ranking service. The client device and server device communicate using the request/response protocol as specified by the IETF ALTO working group.

Illustrative Network Device

Figure 5:
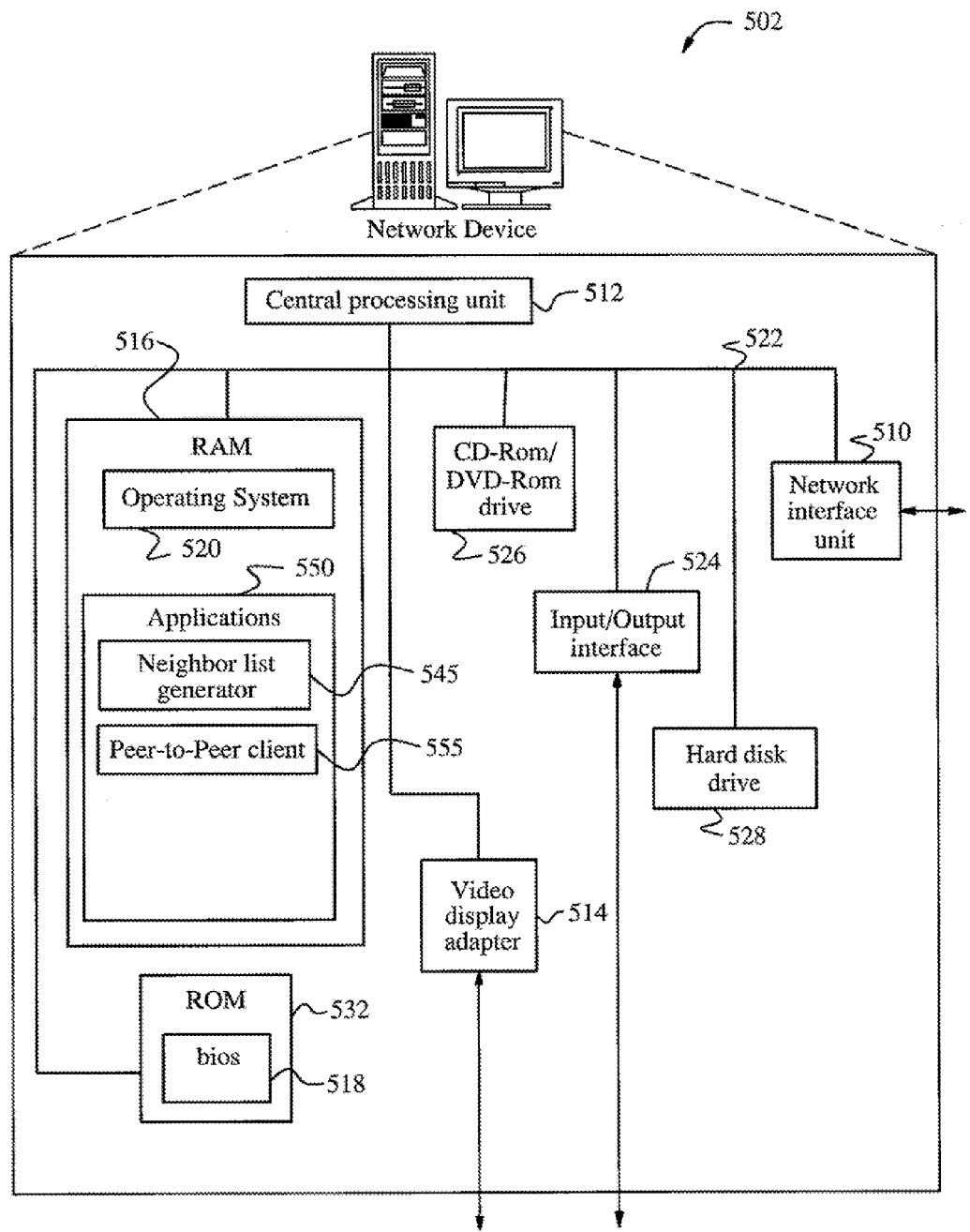
FIG. 5 shows a block diagram of one embodiment of a network device that may be included in a system implementing an embodiment of the invention.

FIG. 5 shows one embodiment of a network device, according to one embodiment of the invention. Network device 502 may include many more components than those shown. The components shown, however, are sufficient to disclose an illustrative embodiment for practicing the invention. Network device 502 may represent, for example, client device 101 of FIG. 1; server device 108 of FIG. 1; tracker device 106 of FIG. 1; requesting peer 301 of FIG. 3; requesting peer 401 of FIG. 3; node 309 of FIG. 3; node 409 of FIG. 4; server device 308 of FIG. 3; server device 408 of FIG. 4; tracker 306 of FIG. 3; or tracker 406 of FIG. 4.

Network device 502 includes processing unit 512, video display adapter 514, and a mass memory, all in communication with each other via bus 522. The mass memory generally includes RAM 516, ROM 532, and one or more permanent mass storage devices, such as hard disk drive 528, tape drive, optical drive, and/or floppy disk drive. The mass memory stores operating system 520 for controlling the operation of network device 502. Any general-purpose operating system may be employed. Basic input/output system ("BIOS") 518 is also provided for controlling the low-level operation of network device 502. As illustrated in FIG. 5, network device 502 also can communicate with the Internet, or some other communications network, via network interface unit 510, which is constructed for use with various communication protocols including the TCP/IP protocol. Network interface unit 510 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

RAM 516 may include one or more data stores, which can be utilized by network device 502 to store, among other things, applications 550 and/or other data. RAM 516 can also be used to store database information.

The mass memory also stores program code and data. One or more applications 550 are loaded into mass memory and run on operating system 520. Examples of application programs may include transcoders, schedulers, calendars, database programs, word processing programs, HTTP programs, customizable user interface programs, IPSec applications, encryption programs, security programs, web servers, account management, and so forth. Applications 550 may include neighbor list generator 545 and peer-to-peer client 555. For example, embodiments of client device 101 of FIG. 1, requesting peer 301 of FIG. 3, or requesting peer 401 of FIG. 4 may include peer-to-peer client 555 for use in peer-to-peer file sharing. Server device 108 of FIG. 1 or server device 308 of FIG. 3 or server device 408 of FIG. 4 may include neighbor list generator 545 to generate the neighbor list, and may also include peer-to-peer client 555 to use in helping the server device to determine all of the neighbor peers for a particular file.

Illustrative Process

Figure 6:
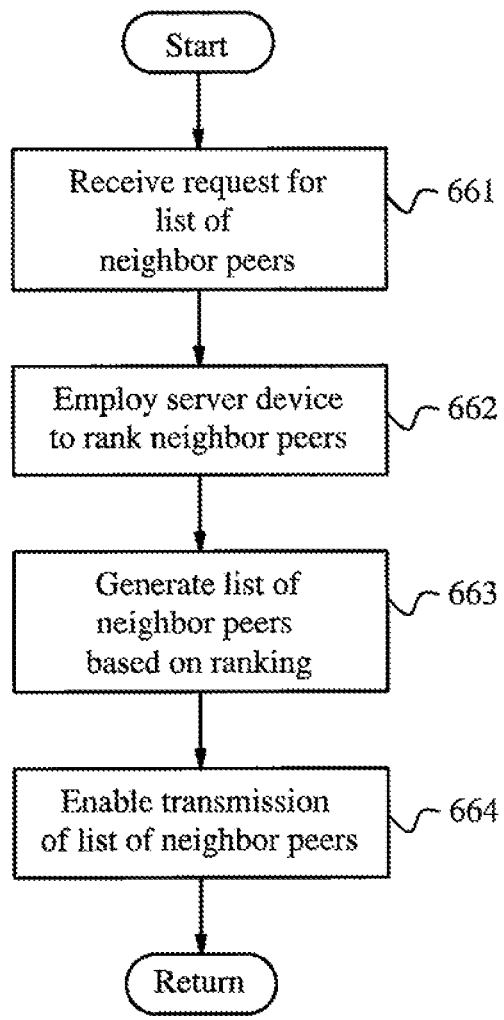
FIG. 6 illustrates a flow chart of an embodiment of a process for peer-to-peer file sharing.

FIG. 6 illustrates a flow chart of an embodiment of a process (660) for peer-to-peer file sharing. After a start block, the process proceeds to block 661, where a request for a list of neighbor peers is received. In some embodiments, the local ISP (i.e., the ISP of the peer that made the request) controls the tracker, and the tracker receives the request. In other embodiments, the request is received by intercepting the request that was intended for the tracker.

The process then advances to block 662, where a server device associated with the local ISP is employed to rank the neighbor peers. The server device ranks the peers based on, for each neighbor peer in the plurality of neighbor peers, whether the neighbor peer is external to the local ISP, and if the neighbor peer is external to the ISP, further based on a cost metric associated with the next ISP hop from the requesting peer device to the neighbor peer. In embodiments in which the tracker is controlled by the ISP, the tracker may be the "server device" that controls the ranking, or the tracker may communicate with a separate server device to perform the ranking.

For example, in some embodiments, the ranking is based on the following decreasing order of priority:

In local ISP
Through customer ISP
Through peering ISP
Through cheapest provider
Through most expensive provider The first priority, "In local ISP", means that the peer is in the same ISP as the requesting ISP (i.e., the requesting peer is not external to the local ISP). For each other priority, reference is being made to the next ISP hop. So, if the peer is in the local ISP, the peer is given the highest level of preference. If the peer is external to the ISP, but the next ISP hop is through a customer ISP, the peer is given the second level of preference. If the peer is external to the ISP, but the next ISP hop is through a peering ISP, the peer is given the third level of preference. For peers that are external to the ISP, and the ISP at the next hop is neither a customer ISP nor a peering ISP, the peers are ranked based on price of the ISP. Typically, for traffic to an ISP that is neither a customer ISP nor a peering ISP, the ISP pays a fixed price per bit, which changes relatively infrequently. The server device may store a list of the ISPs which are neither customer ISPs nor peering ISPs, ordered by price. This ranking is used for the ranking of all ISPs that are neither customer ISPs nor peering ISPs.

The term next ISP hop means the ISP that is next on the network-level route of packets that travel along the network-level route from the requesting peer to the neighbor peer. For example, a neighbor peer that is in an expensive ISP which is neither a customer ISP nor a peering ISP, is still given the second priority if the local ISP can reach the neighbor by routing traffic to the customer ISP as the next ISP hop.

Just as customers pay an ISP for Internet access, an ISP may pay upstream ISPs for Internet access. If one ISP has another ISP as a customer, the customer ISP pays the ISP for all traffic sent to it. Therefore, if an ISP sends traffic to a customer ISP, this results in positive revenue rather than costing the ISP money.

Many ISPs engage in peering arrangements, in which multiple ISPs interconnect at peering points or Internet exchange points, allowing routing of data between each network, without charging each other for the data being transmitted. However, if traffic becomes asymmetric, an ISP which is receiving significantly more traffic from an ISP than it sends to that ISP may seek to end the peering agreement. Accordingly, in the example given above, peering ISPs are preferred to ISPs that cost the ISP money, but are less preferable than peers in the local ISP or available through a customer ISP, to reduce the possibility of asymmetric traffic flow that could jeopardize the peering agreement.

The determination of whether an ISP is a customer ISP is one type of cost metric. The determination of whether an ISP is a peering ISP is another type of cost metric. The price per bit of traffic sent from the local ISP to the ISP associated with the next ISP hop is yet another type of cost metric. In the embodiment discussed above, each of these three different types of cost metrics may be used. In other embodiments, not all three of these types of cost metrics are used, and in other embodiments, a type of cost metric other than these three cost metrics may be employed.

In some embodiments, peers at the same level of priority may be ranked the same, and selection between them is made randomly. In other embodiments, other criteria may be employed to select between peers of the same rank.

Although a particular example of ranking is stated above, many alternative embodiments are within the scope and spirit of the invention. For example, the first three priority levels, local ISP, customer ISP, and peering ISP could be interchanged with each other in other embodiments, could be treated at the same level of priority of each other, or either or both of peering arrangements and customer arrangement may be disregarded from the priority in some embodiments. Of course, categories that are not applicable can be ignored. For example, for an ISP that does not have any peering arrangement, the peering arrangement priority can be removed. But even for an ISP that has peering arrangements, this priority can be removed in some embodiments.

In some embodiments, traffic sent to a customer ISP could be viewed as a higher priority than even a local peer, since such traffic would result in positive revenue to the ISP. In some embodiments, some or all of the categories of local ISP, customer ISP, and peering ISP could all be viewed as the same level of priority, since they all have no cost to the ISP.

Although the ranking between cheapest through most expensive providers is based on price per bit in some embodiments, in other embodiments, a cost metric other than price per bit to the ISP may be employed. These embodiments and others are within the scope and spirit of the invention.

The process then moves to block 663, where a list of neighbor peers is generated based on the ranking. In embodiments in which the BitTorrent protocol is used, the list of neighbor peers has 50 neighbor peers in accordance with the protocol. Accordingly, in these embodiments, the top 50 ranked neighbor peers are placed in the list of neighbor peers. As previously discussed, in some embodiments, neighbor peers that are at the same level of priority may be selected randomly.

The process then proceeds to block 664, where the transmission of the list of neighbor peers is enabled.

Figure 7:
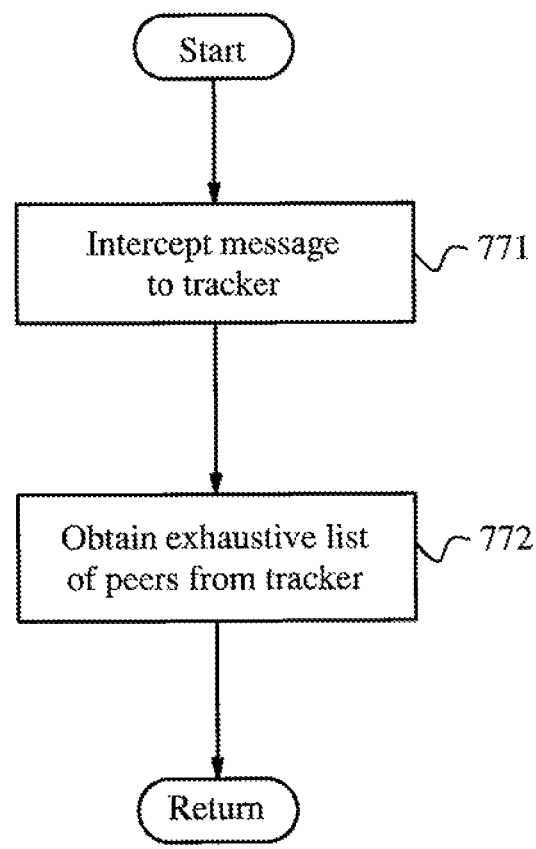
FIG. 7 shows a flow chart of an embodiment of a process of receiving the request for the list of network peers of FIG. 6.

FIG. 7 shows a flow chart of an embodiment of a process (770) of receiving the request for the list of network peers. Process 770 may be performed prior to process 660 of FIG. 6 in embodiments in which the ISP does not control the tracker. If the ISP controls the tracker, process 770 does not need to be performed. After a start block, the process proceeds to block 771, where the request for a list of neighbor peers to the tracker is intercepted by the ISP. The process then advances to block 772, where the ISP obtains an a list of peers from the tracker. In some embodiments, the ISP obtains an exhaustive list of peers from the tracker. However, in other embodiments, only a subset of all of the neighbor peers is obtained. In one embodiment, this is accomplished by the ISP server device repeatedly making requests for a list of neighbor peers to the tracker (as if the ISP server device was a peer), until all of the neighbor peers are obtained. The process then moves to a return block, where other processing is resumed.

Illustrative Ranking

Figure 8:
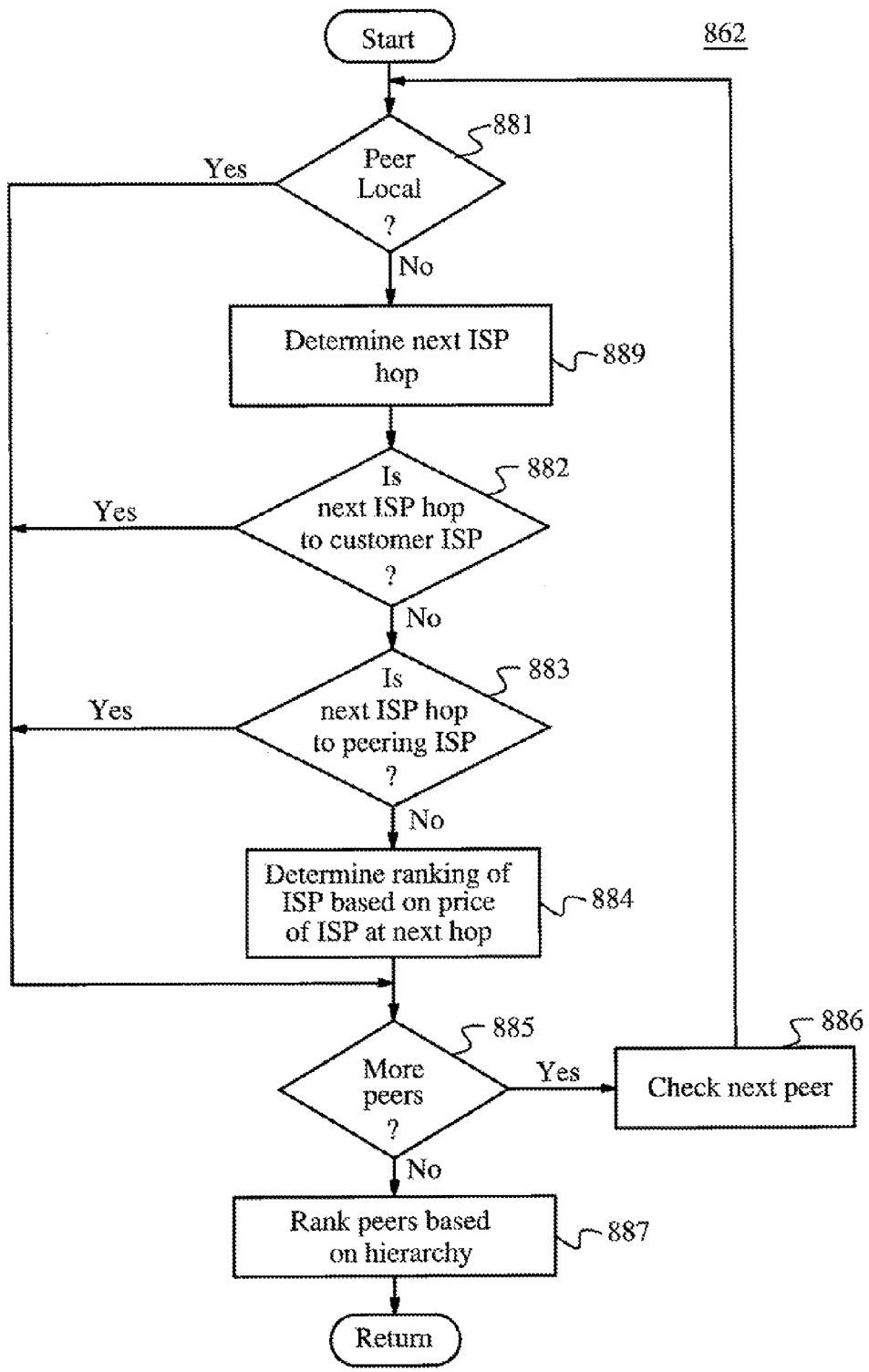
FIG. 8 illustrates a flow chart of an embodiment of the step of ranking the neighbor peers of FIG. 6, in accordance with aspects of the present invention.

FIG. 8 illustrates a flow chart of an embodiment of a process (862) of ranking the neighbor peers of FIG. 6. Process 862 may be employed as an embodiment of block 662 of FIG. 6.

After a start block, the process proceeds to decision block 881, where a determination is made as to whether the neighbor peer is in the local ISP. If so, the process advances to decision block 885. If however, the neighbor peer is external to the local ISP, the process moves to block 889, where the next ISP hop is determined. The process then proceeds to decision block 882, where a determination is made as to whether the next ISP hop is to a customer ISP. If so, the process advances to decision block 885.

If, however, the next ISP hop is not to a customer ISP, the process proceeds to decision block 883, where a determination is made as to whether the next ISP hop is to a peering ISP. If so, the process advances to decision block 885. If, however, the next ISP is not to a peering ISP, the process proceeds to block 884, where the ranking of the ISP is determined based on a cost metric associated with the ISP at the next ISPs hop, for example, the price per bit paid by the local ISP to send traffic to the ISP. In some embodiments, the service device stores a list of customer ISPs and peering ISPs, if any, and also stores a list of all other ISP, ordered by price per bit, since the price changes relatively infrequently. In this case, in step 884, the ranking is based on the stored order of price per bit.

The process then proceeds to decision block 885, where a determination is made as to whether the process has been performed for all neighbor peers. "All neighbor peers" all neighbor peer obtained at step 772 of FIG. 7. In some embodiments, it is an exhaustive list of all neighbor peers. However, the list need not be exhaustive, and in some embodiments "all neighbors peers" means only a subset of all neighbor peers, particularly in the case when, for very large groups, there may be hundreds of thousands or more peers. In embodiments in which the ISP controls the tracker, the tracker already has all of the neighbor peers, and so the list would not need to be separately obtained.

If there are more peers to evaluate, the process moves to block 886, where the next peer is checked. The process then moves to decision block 881, where a determination is made as to whether the next neighbor peer is local to the ISP. This process continues for every neighbor peer in the list of "all neighbor peers" (as discussed above, "all neighbor peers" is not necessarily an exhaustive list of all neighbor peers, although it may be in some embodiments; it simply means all neighbor peers obtained at step 772 of FIG. 7). After every peer has been checked, the process moves to block 887, where the peers are ranked based on the following hierarchy. First, peers that are in the local ISP are given top priority. Second, peers for which the next ISP hop is a customer ISP receive second priority. Third, peers for which the next ISP hop is a peering ISP receive third priority. Between peers of equal priority, ranking is random. Finally, peers which are not local to the ISP, and for which the ISP of the next ISP hop is neither a customer ISP nor a peering ISP, the ISPs are ranked based on the price ranking made at block 884. The process then proceeds to a return block, where other processing is resumed.

As previously discussed, many other variations of the hierarchy discussed above are possible, which are also within the scope and spirit of the invention. The specific embodiment discussed above is given by way of example only to describe one particular embodiment, and is not intended to be limiting.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method for peer-to-peer file sharing, comprising:
receiving a request for a list of neighbor peers, wherein the request is made by a requesting peer device to a tracker, and wherein the requesting peer device has a local internet service provider (ISP);
employing a server device to rank each neighbor peer in a plurality of neighbor peers based on whether the respective neighbor peer is external to the local ISP, and if the respective neighbor peer is external to the ISP, further based on a cost metric associated with a next ISP hop from the requesting peer device to the respective neighbor peer;
generating the list of neighbor peers based on the ranking of the neighbor peers; and
enabling transmission of the list of neighbor peers to the requesting peer device;
wherein the cost metric associated with the next ISP hop includes a determination of whether the ISP associated with the next ISP hop is a customer ISP of the local ISP, a determination of whether the ISP associated with the next ISP hop is a peering ISP of the local ISP, and, upon determination that the ISP associated with the next ISP hop is neither a customer ISP nor a peering ISP of the local ISP, a determination of a price rate corresponding to the ISP associated with the next ISP hop based on traffic sent from the local ISP to the ISP associated with the next ISP hop.

2. The method of claim 1, where the ranking is accomplished such that: neighbor peers that are not external to the ISP have the highest ranking, neighbor peers for which the ISP associated with the next ISP hop is a customer to the local ISP have the second highest ranking, neighbor peers for which the ISP associated with the next ISP hop is a peering ISP have the third highest ranking, and neighbor peers for which the ISP associated with the next ISP hop is neither a customer ISP nor a peering ISP are ranked relative to each other based on a price rate corresponding to the ISP associated with the next ISP hop based on traffic sent from the local ISP to the ISP associated with the next ISP hop.

3. The method of claim 1, further comprising:
controlling the tracker to generate the list of neighbor peers based on the ranking of the neighbor peers.

4. The method of claim 1, further comprising:
intercepting the request for the list of neighbor peers, wherein the request for the list of neighbor peers is a request from the requesting peer device to the tracker, such that the tracker does not receive the request for the list of neighbor peers; and
communicating with the tracker to determine the plurality of neighbor peers.

5. The method of claim 4, wherein the intercepting the request includes:
for traffic on the ISP, using packet inspection to determine whether the packet is associated with peer-to-peer network protocol, and if the packet is determined to be associated with a peer-to-peer network protocol, using packet inspection to determine whether the packet is part of a request for a neighbor list, and if the packet is determined to be part of a request for the neighbor list, re-routing the packet to the server device.

6. The method of claim 4, wherein the communicating with the tracker to determine the plurality of neighbor peers includes sending repeated requests for a list of neighbor peers to the tracker until each of the neighbor peers is determined.

7. The method of claim 1, wherein the tracker implements an Application-Layer Traffic Optimization (ALTO) client; the server device implements an ALTO server; and the tracker and server device communicate via the ALTO request/response protocol.

8. A non-transitory processor-readable medium having processor-executable code encoded therein, which when executed by one or more processors, enables actions for peer-to-peer file sharing, comprising:
receiving a request for a list of neighbor peers, wherein the request is made by a requesting peer device, and wherein the requesting peer device has a local Internet service provider (ISP);
employing a server device to rank each neighbor peer in a plurality of neighbor peers based on whether the respective neighbor peer is external to the local ISP, and if the respective neighbor peer is external to the ISP, further based on a cost metric associated with a next ISP hop from the requesting peer device to the respective neighbor peer;
generating the list of neighbor peers based on the ranking of the neighbor peers; and
enabling transmission of the list of neighbor peers to the requesting peer device;
wherein the cost metric associated with the next ISP hop includes a determination of whether the ISP associated with the next ISP hop is a customer ISP of the local ISP, a determination of whether the ISP associated with the next ISP hop is a peering ISP of the local ISP, and, upon determination that the ISP associated with the next ISP hop is neither a customer ISP nor a peering ISP of the local ISP, a determination of a price rate corresponding to the ISP associated with the next ISP hop based on traffic sent from the local ISP to the ISP associated with the next ISP hop.

9. A network device for peer-to-peer file sharing, comprising:
a processor that is arranged to enable actions, including:
receiving a request for a list of neighbor peers, wherein the request is made by a requesting peer device, and wherein the requesting peer device has a local internet service provider (ISP);
employing a server device to rank each neighbor peer in a plurality of neighbor peers based on whether the respective neighbor peer is external to the local ISP, and if the respective neighbor peer is external to the ISP, further based on a cost metric associated with a next ISP hop from the requesting peer device to the respective neighbor peer; and generating the list of neighbor peers based on the ranking of the neighbor peers; and a transceiver that is arranged to transmit the list of neighbor peers to the requesting peer device over a network;

wherein the cost metric associated with the next ISP hop includes a determination of whether the ISP associated with the next ISP hop is a customer ISP of the local ISP, a determination of whether the ISP associated with the next ISP hop is a peering ISP of the local ISP, and, upon determination that the ISP associated with the next ISP hop is neither a customer ISP nor a peering ISP of the local ISP, a determination of a price rate corresponding to the ISP associated with the next ISP hop based on traffic sent from the local ISP to the ISP associated with the next ISP hop.

10. A system for peer-to-peer file sharing, comprising:

a requesting peer device that is arranged to make a request for a list of neighbor peers, wherein the requesting peer device has a local interne service provider (ISP); and a network device that is arranged to perform actions, including:

receiving the request for a list of neighbor peers;

ranking each neighbor peer in a plurality of neighbor peers based on, for each neighbor peer in the plurality of neighbor peers, whether the neighbor peer is external to the local ISP, and if the neighbor peer is external to the ISP, further based on a cost metric associated with the next ISP hop from the requesting peer device to the neighbor peer;

generating a list of neighbor peers based on the ranking of the neighbor peers; and transmitting the list of neighbor peers to the requesting peer device;

wherein the cost metric associated with the next ISP hop includes a determination of whether the ISP associated with the next ISP hop is a customer ISP of the local ISP, a determination of whether the ISP associated with the next ISP hop is a peering ISP of the local ISP, and, upon determination that the ISP associated with the next ISP hop is neither a customer ISP nor a peering ISP of the local ISP, a determination of a price rate corresponding to the ISP associated with the next ISP hop based on traffic sent from the local ISP to the ISP associated with the next ISP hop.

* * * * *